United States Patent [19]

Sumlin

[11] Patent Number: 4,769,746
[45] Date of Patent: Sep. 6, 1988

[54] PORTABLE FOG AND DRIVING LIGHT ASSEMBLY

[76] Inventor: Ralph G. Sumlin, R.D. 1, Box 723, Farmington, W. Va. 26571

[21] Appl. No.: 942,515

[22] Filed: Dec. 15, 1986

[51] Int. Cl.⁴ ............................................. B60Q 1/06
[52] U.S. Cl. ...................................... 362/66; 362/69; 362/70; 362/220; 362/212
[58] Field of Search .................... 362/66, 61, 65, 69, 362/70, 40, 220, 272, 386, 423

[56] References Cited

U.S. PATENT DOCUMENTS

| | | |
|---|---|---|
| 1,543,951 | 6/1925 | Pierce . |
| 1,628,193 | 5/1927 | Riehl . |
| 1,655,851 | 1/1928 | Weil . |
| 1,716,546 | 6/1929 | Fry . |
| 1,842,800 | 1/1932 | Rhodes . |
| 1,988,894 | 1/1935 | Germain ............................ 240/7.1 |
| 2,036,435 | 4/1936 | Phelps .............................. 240/7.1 |
| 2,124,346 | 7/1938 | Grimes .............................. 240/41 |
| 2,140,855 | 12/1938 | Scott ................................. 240/7.1 |
| 2,214,447 | 9/1940 | Bave ................................. 240/7.1 |
| 2,286,338 | 6/1942 | Bruno ............................... 240/7.7 |
| 2,317,619 | 4/1943 | Kramer ............................... 180/1 |
| 2,443,007 | 6/1948 | Katz ................................. 240/7.7 |
| 2,444,846 | 7/1948 | Potts ................................ 362/69 |
| 2,662,605 | 12/1953 | Riggs ................................ 180/1 |
| 2,737,575 | 3/1956 | Ross ................................ 240/7.1 |
| 4,246,628 | 1/1981 | Ikemizu et al. ................... 362/66 X |
| 4,602,319 | 7/1986 | Moriyama et al. ............... 362/66 X |

Primary Examiner—Larry Jones
Attorney, Agent, or Firm—Webb, Burden, Ziesenheim & Webb

[57] ABSTRACT

A rotatable fog light assembly is provided in combination with an automotive vehicle, in the form of an elongate shaft rotatable at opposite ends in bearings on the vehicle, lamps on one end of carrier arms extending transversely from the shaft, a pinion operatively connected to one end of the shaft for rotating through 45° and a reversible drive engaging the pinion means for rotating the shaft and the lamp carrying arm from a first position generally vertically below the bumper of the vehicle and a second position generally behind and in the horizontal plane of the bumper.

6 Claims, 2 Drawing Sheets

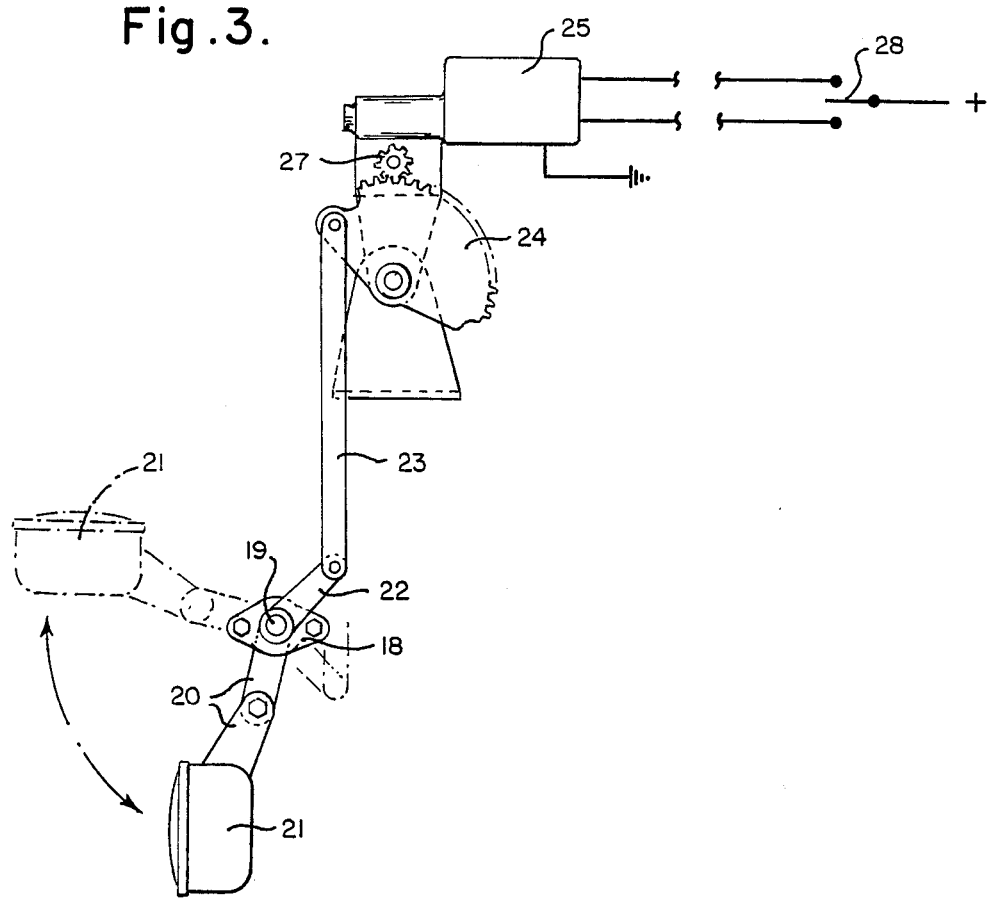

PORTABLE FOG AND DRIVING LIGHT ASSEMBLY

This invention relates to rotatable fog and driving light assemblies and particularly to an assembly for rotating fog or driving lights from an operable position generally beneath the front bumper of a vehicle with the light facing forward to an inoperable or retracted position behind the bumper with the lights generally facing down.

The idea of rotating lamps between an operative and an inoperative position is in itself not new. It is common in airplanes to rotate lamps from a body recess to an exposed position out of the body. Such devices are shown, for example, in Grimes U.S. Pat. No. 2,124,346, Bruno U.S. Pat. No. 2,286,338 and Katz U.S. Pat. No. 2,443,007. It has also been proposed to retract fog lights from an exposed position beneath the vehicle bumper to a closed position behind the bumper. Devices of this sort are illustrated in Riggs U.S. Pat. No. 2,662,605 and Ross U.S. Pat. No. 2,737,575. However, these proposals have met with little or no acceptance because of their expense and complexity. For example, the structure of the Riggs patent requires a large annular housing and drive motor which operates an elongate vertical screw up and down in an internally rotatable shaft driven by pinion gear in housing. This in turn acts through a half annulus on a lever connected to a pair of coaxial shafts which carry fog lamps. This is a very complex, expensive system which requires a large amount of room between the radiator of a vehicle and the radiator shell. It is subject to misalignment and bending of the screw. The screw is necessarily exposed to dirt and damage from road splash, which not only includes water and soil but also salt, sand and stones when the lights are in operative condition. On the other hand, Ross provides a system having a supporting bar in two half sections which are bolted together to provide a support for spaced lamps. The bar is supported on the vehicle by two spaced shell and socket universal joints on spaced clamps on the vehicle. An operating arm is connected intermediate its ends to the supporting bar at one end. Cables are connected to the opposite ends of arm and extend to the vehicle dashboard. Pulling of one cable or the other will rotate the support bar and thus the lights attached thereto from an operative to an inoperative position. Here again the device is complex, expensive and subject to being damaged by road water, soil, salt, and the like getting on the cables and by the inevitable rust and corrosion that affects pull cables on vehicles. Neither Riggs or Ross has attained any commercial success to applicant's knowledge.

The present invention provides a relatively simple, inexpensive and foolproof structure for rotating fog and/or driving lights from an operative position beneath a front vehicle bumper to a retracted inoperative position behind the bumper. No specially made drives or suspension systems are required.

I provide, in combination with an automotive vehicle having spaced front motor supporting frame members and front bumper support members extending from each frame member and carrying a bumper, a rotatable fog and like light assembly comprising a bearing means mounted on one of each of the front motor support frame members and front bumper support members, an elongate shaft extending between and journaled at opposite ends in said bearing means, at least one lamp carrying arm extending transversely of said shaft, pinion means operatively connected to one end of said shaft for rotating said shaft through at least about 90° to carry said at least one lamp carrying arm from a first position generally vertically below the bumper to a second position generally behind and in the horizontal plane of the bumper, and reversible drive means engaging said pinion means for rotating said shaft and said at least one lamp carrying arm between said first and second positions. Preferably the bearing means are standard pillow blocks fixed to the bumper support members into which the opposite ends of the shaft extend. The bearing means could be mounted at the forward end of the frame members. The shaft may be a pipe in the size range of $\frac{1}{2}$" to $\frac{3}{4}$" diameter. The reversible drive means is preferably a small reversible electric motor with a worm gear for engaging the pinion such as the drive motor and worm used for driving electric windows on automotive vehicles. Alternatively the drive means could be a small hydraulic motor if a hydraulic pressure fluid source is available on the vehicle. Preferably the drive means is operated from a two way reversing switch on the dashboard of the vehicle. Such switch, in the case of an electric drive motor, could be a standard electric window switch from an automotive window.

In the foregoing general description of my invention I have set out certain objects, purposes and advantages of my invention. Other objects, purposes and advantages of this invention will be apparent from a consideration of the following description and the accompanying drawings in which:

FIG. 3 is an enlarged fragmentary elevational view, showing a drive arrangement for the assembly of this invention.

Figure 1:
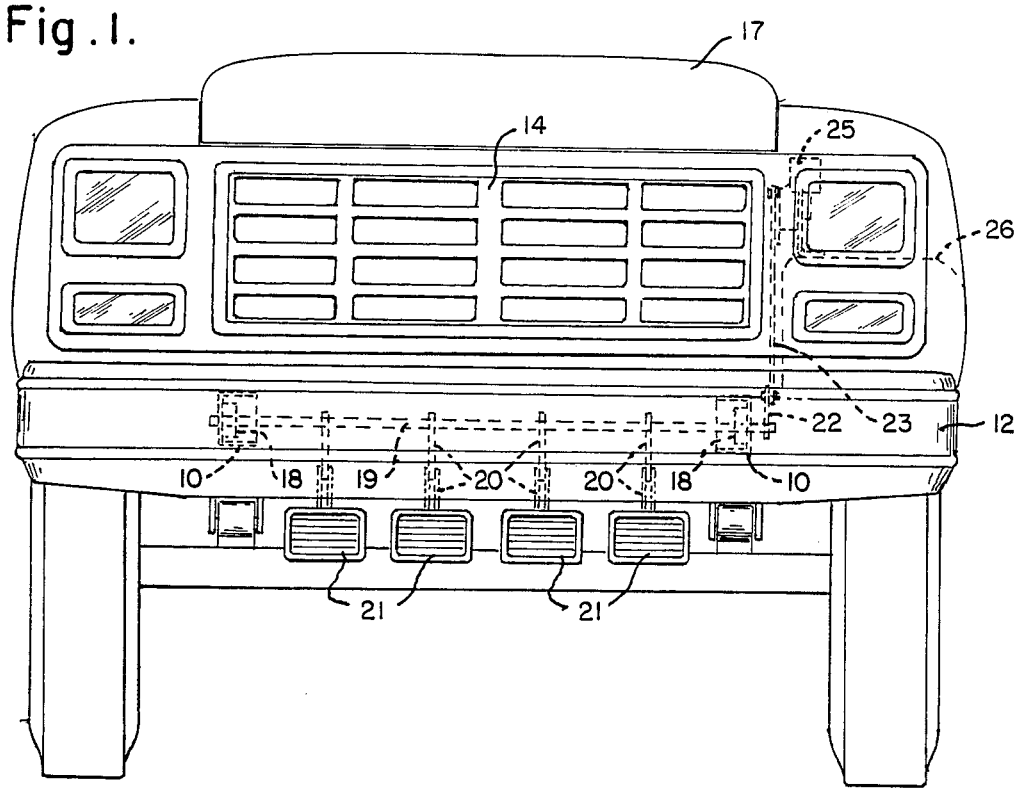
FIG. 1 is a front elevational view of a motor vehicle with the rotatable fog light assembly of this invention.

Referring to the drawings, I have illustrated a conventional automotive front motor support frame 10 to which is connected bumper support members 11 carrying bumper 12. A generally horizontal splash plate 13 is connected to the frame 10 or to radiator grill 14 and extends between the radiator grill 14 and bumper 12. Behind grill 14 is the automotive radiator 15 and hood 17.

Fixed to each side of the frame 10 is a pillow block 18. A rotatable shaft 19 such as a $\frac{1}{2}$ inch pipe is journaled adjacent its opposite ends in the pillow blocks 18. Intermediate the ends of shaft 19 are one or more transverse arms 20 carrying a fog or driving lamp 21 at the end remote from shaft 19. Preferably the arms 20 are in two pieces connected at one end to provide adjustability for lamps 21. One end of shaft 19 is connected to one end of a lever arm 22 which extends transversely thereof. The other end of lever arm 22 is connected to one end of a vertical shaft 23. The other end of shaft 23 is connected to a pinion 24 which may be in the form of a fraction of a pinion such as a half pinion. An electric drive motor 25 is mounted on the inner fender 26 and carries a small pinion gear 27 drivingly engaging the pinion 24. The motor 25 is connected to the vehicle battery by means of a dual direction switch, such as a motor vehicle door window switch 28.

Figure 2:
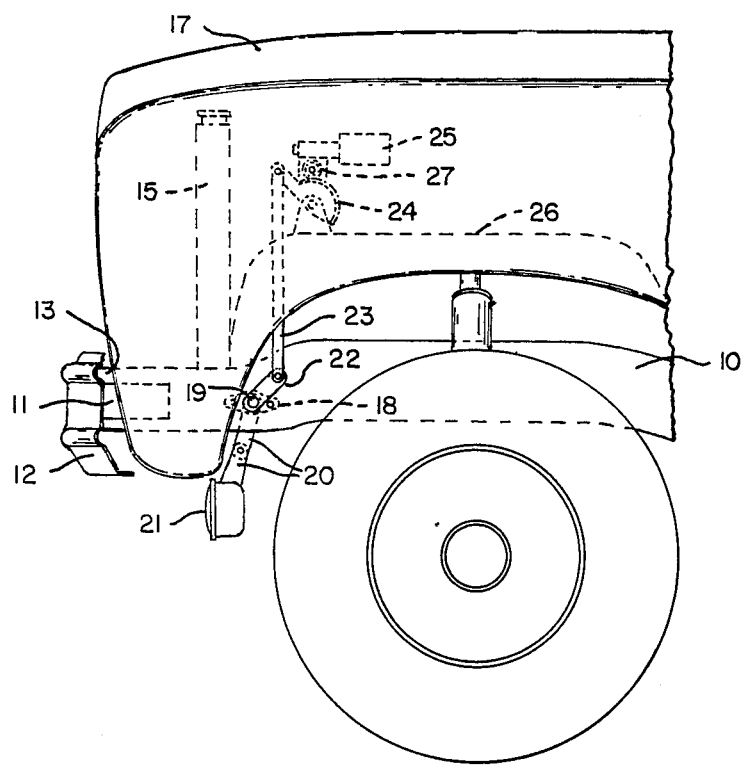
FIG. 2 is a side elevation of the vehicle of FIG. 1 with the fog light retracting mechanism in chain line.

In operation the switch 28 is moved to energize the motor, and assuming that the light or lights 21 are in the retracted position (chain line in FIG. 3) within the area between the grill and radiator behind the bumper, the pinion gear 27 rotates pinion 24 and with it moves shaft 23 upwardly, viewing FIGS. 2 and 3, to bring the transverse arms 20 vertically downwardly beneath the bumper 12 (solid line in FIG. 3) so as to throw a beam of light close to the road surface forward of the vehicle. Moving the switch in the opposite direction reverses the motor and moves the shaft 23 in the opposite direction to return the lights to their retracted position behind the bumper and between the grill and radiator.

In the foregoing specification I have set out certain preferred practices and embodiments of this invention, however, it will be understood that this invention may be otherwise embodied within the scope of the following claims.

I claim:

1. In combination with an automotive vehicle having spaced front motor support frame members and front bumper support members extending from each frame member and carrying a bumper, a rotatable fog and driving light assembly comprising bearing means mounted on one of each of the front motor support members and front bumper support members, an elongate shaft extending between and journaled at opposite ends in said bearing means, at least one lamp carrying arm extending transversely from said shaft, lamp means on the end of said arm remote from the shaft, pinion means operatively connected to one end of said shaft for rotating said shaft through at least 90° to carry said lamp carrying arm between a first position generally vertically below the bumper and a second position generally behind and in the horizontal plane of the bumper such that said lamp means is aimed in a generally upward direction, and reversible drive means engaging said pinion means for rotating said shaft and said at least one lamp carrying arm between the first and second positions.

2. The combination as claimed in claim 1 wherein the bearing means are pillow blocks.

3. The combination as claimed in claim 1 wherein the shaft is a pipe having a diameter between about ½ inch and ¾ inch.

4. The combination as claimed in claim 1 or 2 or 3 wherein the drive means is a small electric motor having a pinion gear engaging the pinion means.

5. The combination as claimed in claim 1 or 2 or 3 wherein the drive means is a hydraulic motor.

6. The combination as claimed in claim 1 or 2 or 3 wherein the transverse arms are adjustable intermediate their ends.

* * * * *